(12) United States Patent
Cannon (10) Patent No.: US 6,416,720 B1
(45) Date of Patent: *Jul. 9, 2002

(54) EMERGENCY OXYGEN SUPPLY SYSTEM FOR PASSENGERS IN AIRCRAFT

(75) Inventor: James C. Cannon, Overland Park, KS (US)

(73) Assignee: B/E Aerospace Incorporated, Wellington, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,995

(22) Filed: Aug. 12, 1998

(51) Int. Cl.$^7$ ................................................ A62B 7/08
(52) U.S. Cl. .................. 422/120; 128/200.24; 422/122; 422/123; 422/305; 422/306; 423/219; 423/579
(58) Field of Search ................................. 422/120, 122, 422/123, 305, 306; 128/200.24; 423/219, 579

(56) References Cited

U.S. PATENT DOCUMENTS

| | | |
|---|---|---|
| 2,123,334 A | 7/1938 | Hausmann |
| 3,370,813 A | 2/1968 | Albertine et al. |
| 3,379,195 A | 4/1968 | Bleach |
| 3,580,250 A | 5/1971 | Oroza |
| 3,753,316 A | 8/1973 | Savarieau et al. |
| 3,981,302 A | 9/1976 | Veit |
| 4,023,874 A | 5/1977 | Jong et al. |
| 4,481,945 A | 11/1984 | Levine |
| 4,609,166 A | 9/1986 | Brennan |
| 4,766,893 A | 8/1988 | Drews |
| 4,883,242 A | 11/1989 | Becker et al. |
| 5,096,271 A | 3/1992 | Portman |
| 5,123,409 A | 6/1992 | Sheffield et al. |
| 5,145,128 A | 9/1992 | Umeda |
| 5,154,374 A | 10/1992 | Beroth |
| 5,301,665 A | 4/1994 | Jumprtz et al. |
| 5,322,669 A | 6/1994 | Bechthold et al. |
| 5,336,470 A | 8/1994 | Bechthold et al. |
| 5,598,997 A | 2/1997 | Marquardt |

FOREIGN PATENT DOCUMENTS

| | | |
|---|---|---|
| GB | 2 111 837 A | 7/1983 |
| WO | WO 90/02582 | 3/1990 |

*Primary Examiner*—Krisanne Thornton
(74) *Attorney, Agent, or Firm*—Fulwider Patton Lee & Utecht, LLP (57) ABSTRACT

An oxygen generator of an emergency chemical oxygen generating system is mounted on a sliding mechanism that displaces the oxygen generator vertically and horizontally away from the walls of the oxygen generator container when the door of the module is opened, in order to reduce the heating of the container walls and the surrounding areas. The sliding mechanism can be a telescoping assembly having multiple sliding segments, a slot in the side of the module wall with a tab attached to the generator such that the tab slides within the slot allowing for downward sliding of the generator, or an arrangement of channels and rollers. The movement of the generator from a stowed position to a use position can also initiate the flow of oxygen.

9 Claims, 7 Drawing Sheets

EMERGENCY OXYGEN SUPPLY SYSTEM FOR PASSENGERS IN AIRCRAFT

BACKGROUND OF THE INVENTION

1. Field of the Invention

This invention relates generally to passenger oxygen modules equipped with chemical oxygen generators, and more particularly concerns an oxygen generator mounting structure that permits the oxygen generator to be deployed to a safe position to improve heat dissipation from the chemical oxygen generator away from the chemical oxygen generator container and Structures surrounding the oxygen container.

2. Description of Related Art

Chemical oxygen generators are used in passenger aircraft as a source of oxygen for use by the cabin occupants to protect them from hypoxia in the event of a decompression or depressurization of the passenger cabin. However, the chemical reactions that release oxygen in such chemical oxygen generators are typically highly exothermic, producing a significant amount of heat when the generator is actuated during an emergency. Such heat can damage adjacent airplane structures, especially when those structures are made from lightweight aerospace composite materials.

While such structures can be protected from the heat produced by a chemical oxygen generator by installation of thermal insulation, doing so increases the weight of the installed equipment, which is undesirable for use on airplanes. While insulation can also be achieved by installation of the chemical oxygen generator with a greater air space from the walls of the oxygen module, this approach unfortunately results in oxygen modules that occupy more space, decreasing useful cabin space. Chemical oxygen generating modules are commonly installed beneath the overhead luggage bins, so that if space is added to oxygen modules to facilitate heat management, the oxygen modules are thicker, and the clearance between the heads of the cabin occupants and the module is reduced, which is also undesirable for airlines.

Figure 1A:
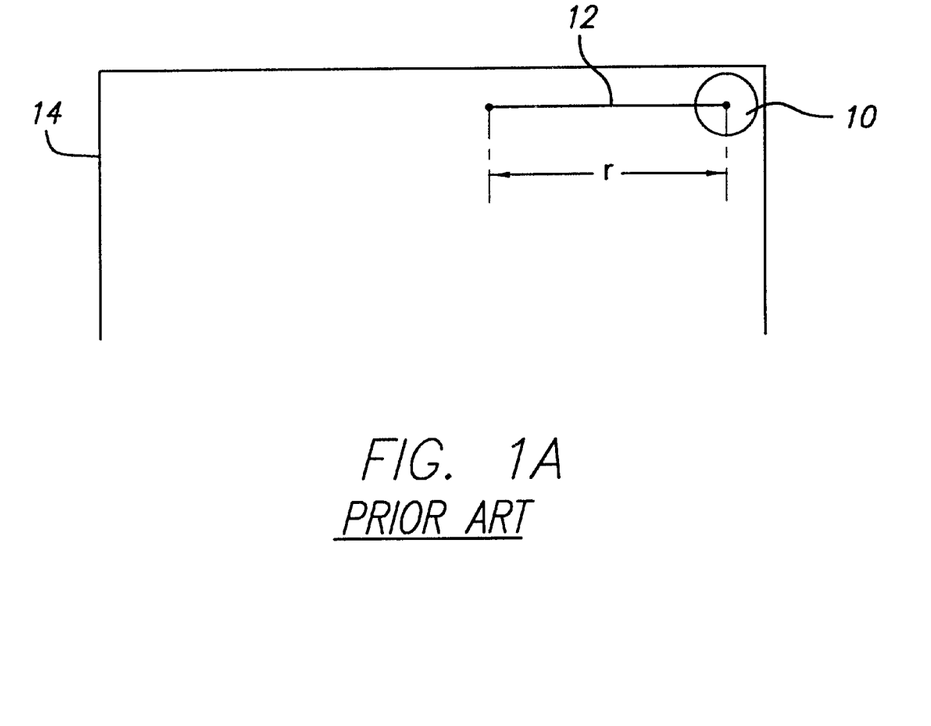
FIG. 1A is a schematic diagram of a prior art pivoting generator in a stowed position.
Figure 1B:
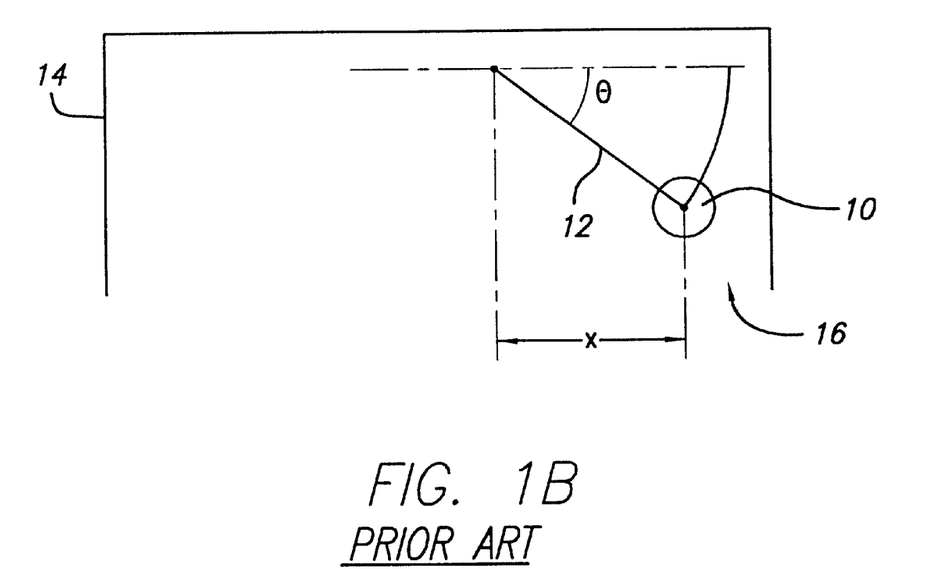
FIG. 1B is a schematic diagram of the prior art pivoting generator of FIG. 1A in a deployed position.

With reference to the prior art illustrated in FIGS. 1A and 1B, one presently known conventional oxygen generator mounting system mounts an oxygen generator 10 on a pivoting arm 12 in an oxygen generator container 14, and pivots the oxygen generator to a lowered position 16 to improve heat dissipation when the oxygen generator container lid is opened to deploy an oxygen mask. As is shown in FIG. 1A, when the pivoting type of oxygen generator is deployed at some angle θ, at any angle θ between 0° and 90°, the horizontal coordinate x of the generator is given by the expression: r cos (θ), and the vertical coordinate y is given by the expression: r sin (θ). However, for a pivoting movement of any given angle θ, the extent of displacement of the oxygen generator is limited by the length of the pivot arm, which is in turn limited by the dimensions of the oxygen module. Thus, while such a system enjoys the benefits of simplicity associated with a pivoting system, such a system imposes restraints on the packaging and deployment enveloper of emergency oxygen systems. It would be desirable to provide an emergency chemical oxygen generating system for passenger aircraft with a mounting mechanism that would allow the oxygen generator to reach a position that lies outside this limited envelope of positions that can be reached by use of a pivoting mounting system for the oxygen generator. The present invention meets these needs.

SUMMARY OF THE INVENTION

Briefly, and in general terms, the present invention provides for an emergency chemical oxygen generating system for passenger aircraft in which the oxygen generator is mounted on a structure that permits the oxygen generator to be displaced vertically and horizontally away from the walls of the container for the oxygen generator when the door of the module is opened, in order to reduce the heating of the container walls, the air gap surrounding the container walls, and the surrounding structures behind the oxygen container. By causing the generator to translate downward and sideways, the choice of positions in which the generator comes to rest can be selected over a wider range of possibilities than if a pivoting repositioning mechanism is employed.

The use of a sliding mounting mechanism allows the generator to reach a position outside the envelope of positions that can be reached by use of a pivoting mounting mechanism. The horizontal and vertical displacements are defined by the angle at which the sliding mounting mechanism is installed, and by the extent of the sliding displacement accomplished by the sliding mounting mechanism.

The invention accordingly provides for an emergency oxygen supply system utilizing a sliding mechanism for mounting of a chemical oxygen generator. The sliding mechanism advantageously slides and may also pivot, for moving the chemical oxygen generator away from the walls of an oxygen module during operation of the generator. Such a capability enhances the ability to avoid heat damage to the oxygen module from the generator and improves the space utilization of the module within the passenger compartment.

In one presently preferred embodiment, the sliding mechanism comprises a telescoping assembly having one end secured to the container and the other end secured to the generator, and having multiple sliding segments producing a total sliding displacement (L) that results in a greater horizontal or vertical displacement than can be accommodated by a pivoting means having dimensions to fit into the confines of the oxygen module.

In an alternate embodiment, the sliding mechanism comprises a slot in the side of the module wall, with a tab attached to the generator, such that the tab slides within the slot, allowing for downward sliding of the generator.

In another alternate embodiment, the sliding mechanism can comprise an arrangement of channels and rollers analogous to those used to permit a file drawer to be moved from a stored position to a position in which the drawer's contents can readily be accessed.

In another aspect of the invention, the movement of the generator from a stowed position to a use position can also initiate the flow of oxygen. For example, the actuation pin of the oxygen generator can be attached to one end of a short lanyard, while the other end of the lanyard can be attached to the module structure, so that when the oxygen generator slides downwardly in relation to the oxygen module structure, the lanyard will withdraw the actuation pin, initiating oxygen flow.

These and other aspects and advantages of the invention will become apparent from the following detailed description and the accompanying drawings, which illustrate by way of example the features of the invention.

DETAILED DESCRIPTION OF THE PREFERRED EMBODIMENTS

Chemical oxygen generators used in passenger aircraft produce heat that can damage adjacent airplane structures. Those structures can be insulated by thermal insulation or by an air space, but the use of insulation results in increased weight, and the provision of an insulating air space results in a decrease of useful cabin space. While mounting the oxygen generator to pivot to a lowered position when deployed can improve heat dissipation, the extent of useful displacement of the oxygen generator is limited by the length of the pivot arm and the dimensions of the oxygen module. The present invention addresses these issues while remaining capable of economical manufacture and servicing, and reliable operation.

As is illustrated in the drawings, the invention is embodied in an emergency oxygen supply system having a sliding mounting mechanism for mounting a chemical oxygen generator, to allow the oxygen generator to slide and pivot, for vertical and horizontal displacement of the chemical oxygen generator away from the walls of an oxygen module during operation of the generator.

Figure 2A:
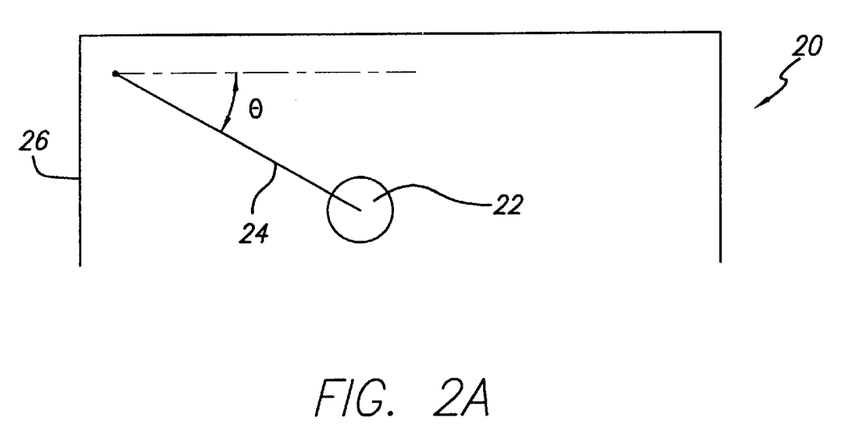
FIG. 2A is a schematic diagram of a sliding generator according to the principles of the invention in a stowed position.
Figure 2B:
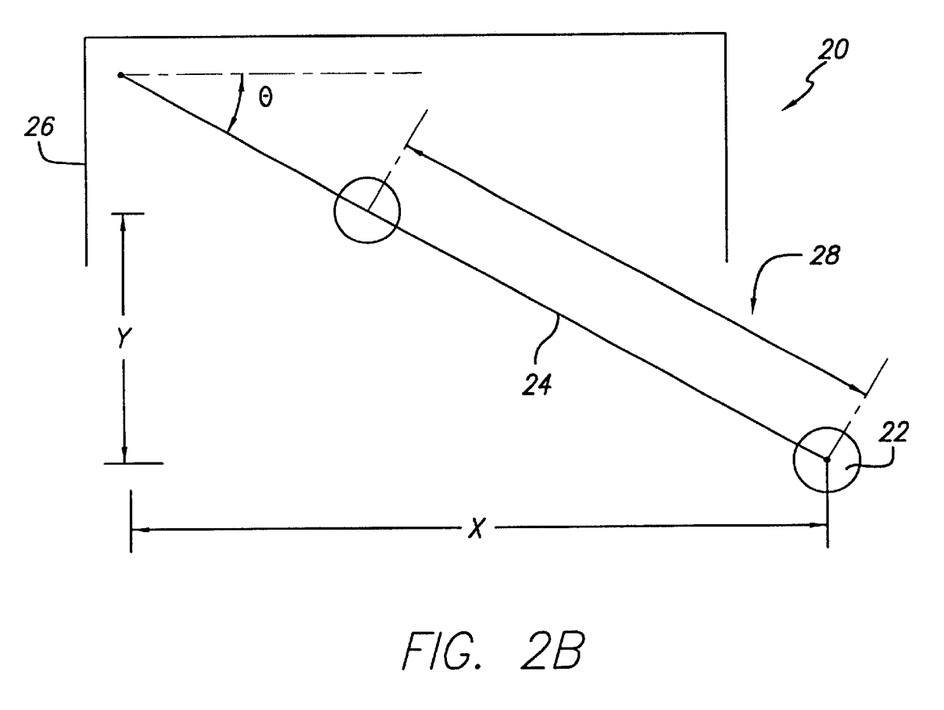
FIG. 2B is a schematic diagram of the sliding generator of FIG. 2A in a deployed position.

With reference to FIGS. 2A and 2B, an emergency chemical oxygen generator system 20 according to the invention includes an oxygen generator 22 and a sliding assembly 24 mounted in the oxygen generator container 26, for sliding at an angle θ to a lowered position 28. As is illustrated in FIGS. 2A and 2B, the horizontal coordinate x for the sliding generator is given by the expression L cos (θ), and the vertical coordinate y is given by the expression L sin (θ).

Figure 3:
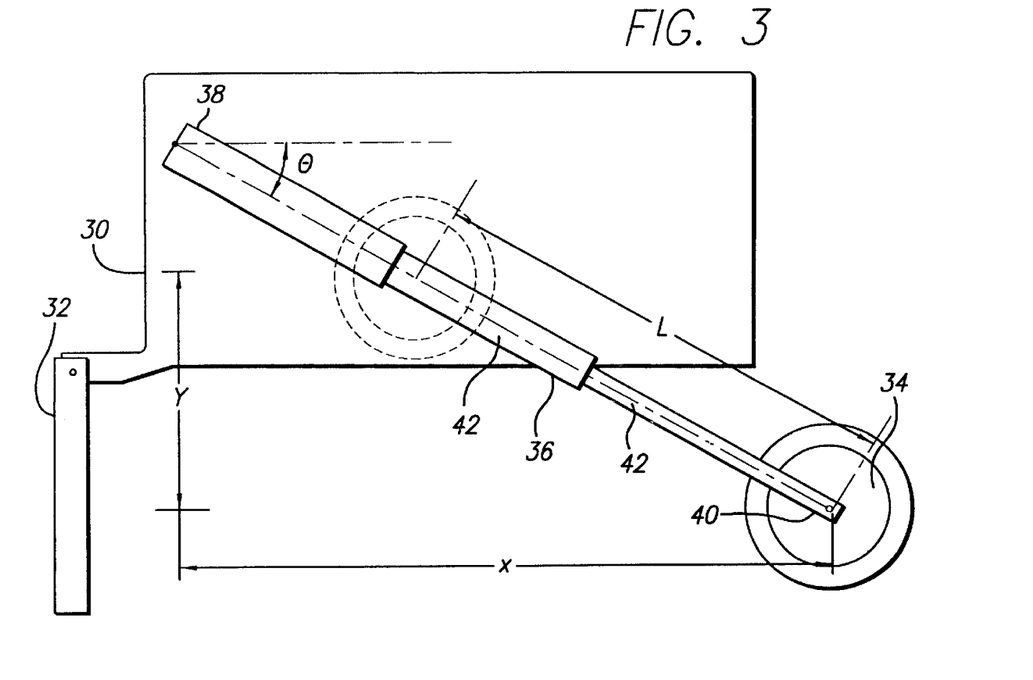
FIG. 3 is a cross-sectional view of a first embodiment of a telescoping sliding generator according to the invention mounted in an oxygen module showing deployment of the oxygen generator.

Referring to FIG. 3, in a presently preferred embodiment, the oxygen module container 30 includes a lid 32 shown in an open position. The oxygen generator 34 is mounted by a sliding mechanism 36 in the container for sliding movement at an angle θ to a lower horizontally and vertically displaced position. In this first preferred embodiment, the sliding mechanism comprises a telescoping assembly having one end 38 secured to the container and the other end 40 secured to the generator, with multiple sliding segments 42 producing a total sliding displacement L.

Figure 4A:
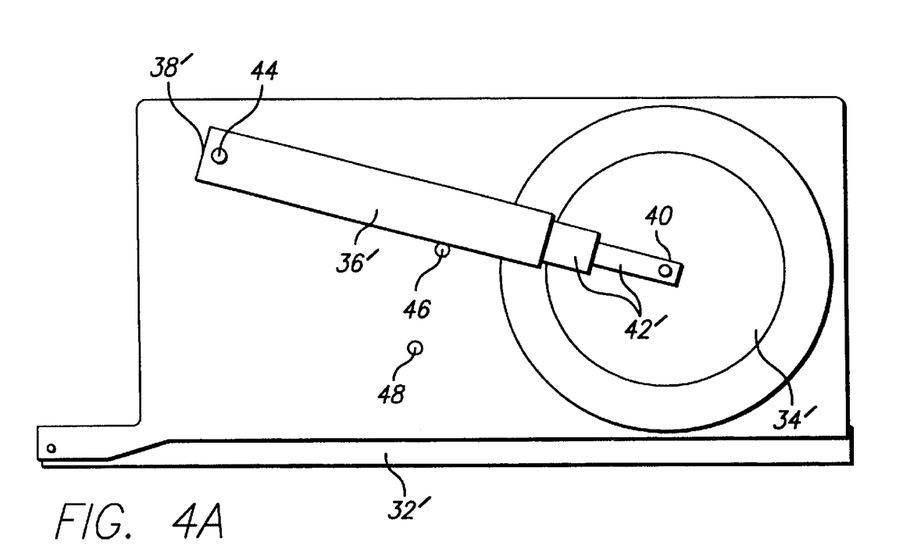
FIG. 4A is a cross-sectional view of a second embodiment of a telescoping sliding generator according to the invention mounted in an oxygen module in a stowed position.
Figure 4B:
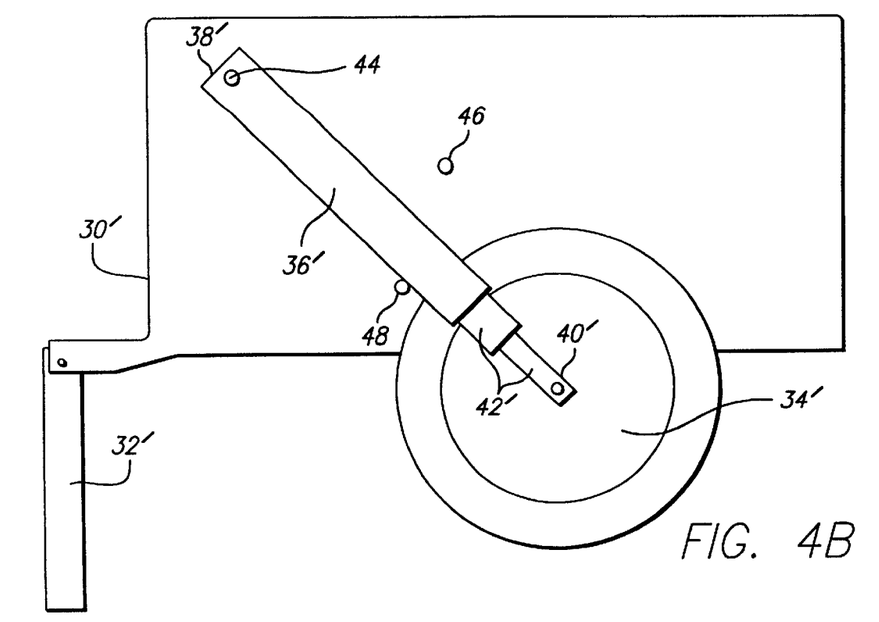
FIG. 4B is a cross-sectional view of the sliding telescoping generator of FIG. 4A in an intermediate position.
Figure 4C:
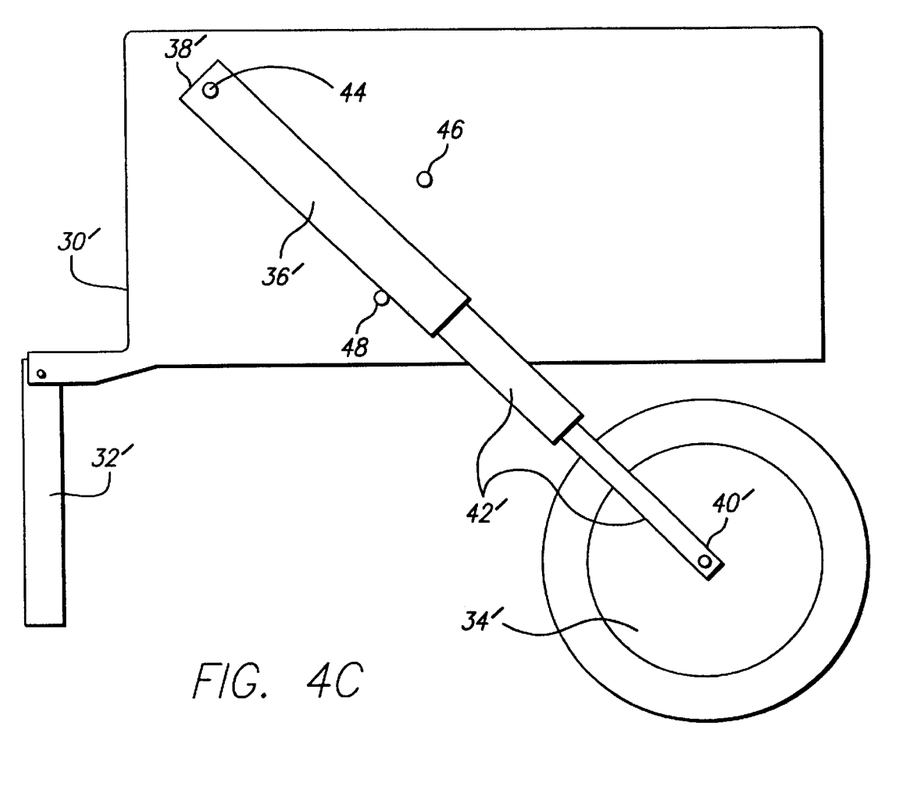
FIG. 4C is a cross-sectional view of the sliding telescoping generator of FIG. 4A in a lowered position.

Referring to FIGS. 4A, 4B and 4C, in a presently preferred embodiment, the oxygen module container 30' includes a lid 32' shown in a stowed or closed position in FIG. 4A. The oxygen generator 34' is mounted by a sliding mechanism 36' in the container for sliding movement to a lower horizontally and vertically displaced position. In this second preferred embodiment, the sliding mechanism comprises a telescoping assembly having one end 38' secured to the container and the other end 40' secured to the generator, with multiple sliding segments 42' producing a total sliding displacement as shown in FIG. 4C. The telescoping assembly 36' can be connected to the container by a pivot pin 44, and can be supported by a retractable pin 46 that can be retracted when the lid opens and the oxygen generator is to be activated, allowing the telescoping assembly to pivot and slide the oxygen generator to a lower intermediate position with the telescoping assembly resting on a lower stop 48, as is shown in FIG. 4B. When the telescoping assembly reaches the lower position of FIG. 4B, the telescoping assembly segments can fully extend to allow the oxygen generator to slide to the fully lowered horizontally and vertically displaced position shown in FIG. 4C. Alternatively, instead of supporting the telescoping assembly by a retractable pin, the oxygen generator can be supported by other similar means, or by the oxygen module container lid in its closed position, so that the oxygen container and telescoping assembly can be released to slide to the intermediate and lowered positions by opening of the lid.

Figure 5A:
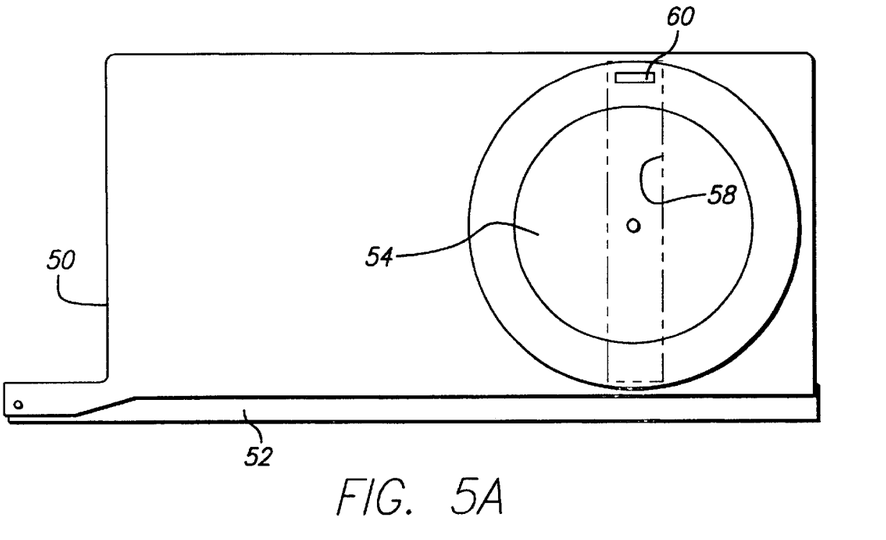
FIG. 5A is a cross-sectional view of a third embodiment of a sliding oxygen generator in a stowed position.
Figure 5B:
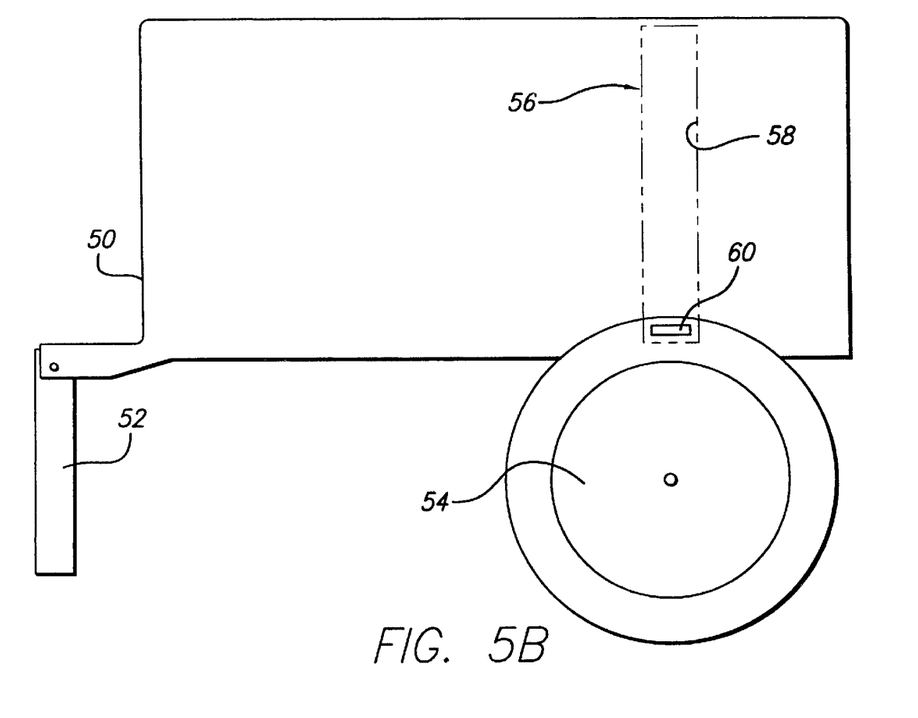
FIG. 5B is a cross-sectional view of the sliding oxygen generator of FIG. 5A in an open position.

With reference to FIGS. 5A and 5B, in a second preferred embodiment, an oxygen module 50 having a lid 52, shown in the closed position in FIG. 5A, includes an oxygen generator 54 mounted by a sliding mechanism 56 in the container for sliding movement to a lower horizontally and vertically displaced position. In this embodiment, the sliding mechanism comprises a slot 58 in the side of the module container wall, with a tab 60 attached to the generator, such that the tab slides within the slot, allowing for downward sliding of the generator, producing a total sliding displacement shown in FIG. 5B. Alternatively, instead of supporting the oxygen generator by a retractable pin, the oxygen generator can be supported in the upper position by the oxygen module lid in its closed position, so that the oxygen generator can be released to slide to the lowered position by opening of the lid.

Figure 6A:
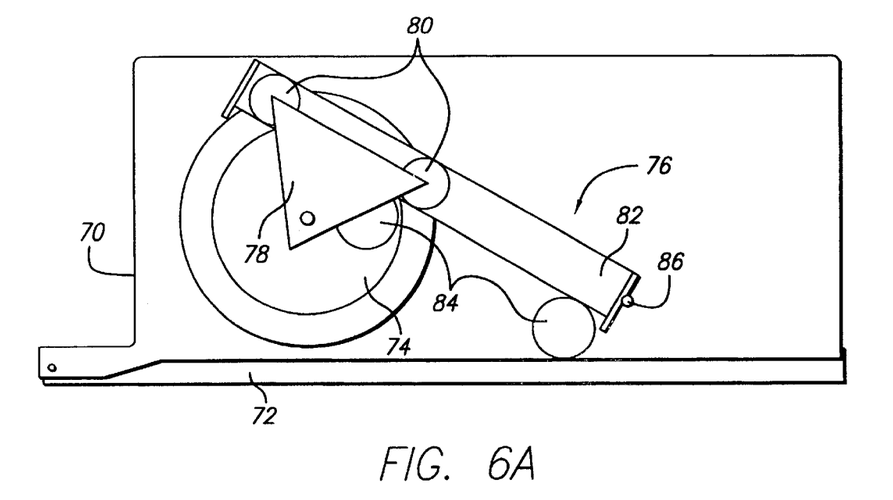
FIG. 6A is a cross-sectional view of a fourth embodiment of a sliding oxygen generator in a stowed position.
Figure 6B:
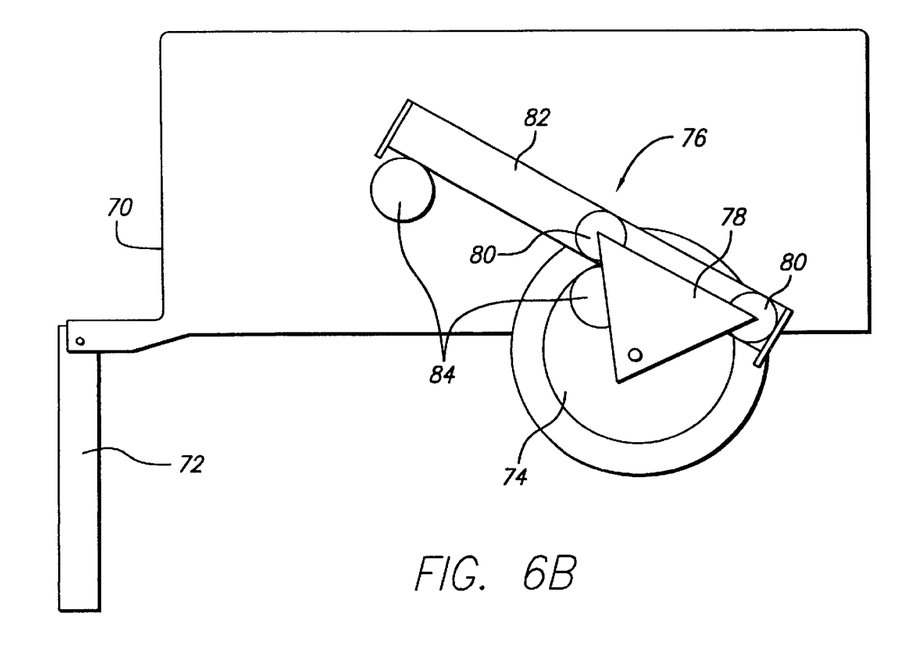
FIG. 6B is a cross-sectional view of the sliding oxygen generator of FIG. 6A in an open position.

As is illustrated in FIGS. 6A and 6B, in a third preferred embodiment, an oxygen module container 70 has a lid 72, shown in a closed position in FIG. 6A. An oxygen generator 74 is mounted in the container by a sliding mechanism 76 to lower the oxygen generator horizontally and vertically. In this embodiment, the sliding mechanism can comprise an arrangement of channels and rollers analogous to those used to permit a file drawer to be moved from a stored position to an open position. The oxygen generator can thus be connected on each side by a bracket 78 between a pair of rollers 80 journalled in a sliding channel member 82 on each side of the oxygen module container. The channel member is in turn mounted on a pair of rollers 84 mounted on each side of the oxygen module container at a downwardly directed angle, and can be retained in this position by a retractable pin 86, disposed in the oxygen module container at the lower end of the channel member. The retractable pin can be retracted when the lid opens, and the oxygen generator is to be activated, allowing the sliding roller assembly and oxygen generator to slide at a lower horizontally and vertically displaced position. Alternatively, instead of supporting the roller assembly and oxygen generator by a retractable pin, the roller assembly and oxygen generator can be supported by the lid in its close position, so that the oxygen generator can be released to slide to the lower position by opening of the lid.

Figure 7:
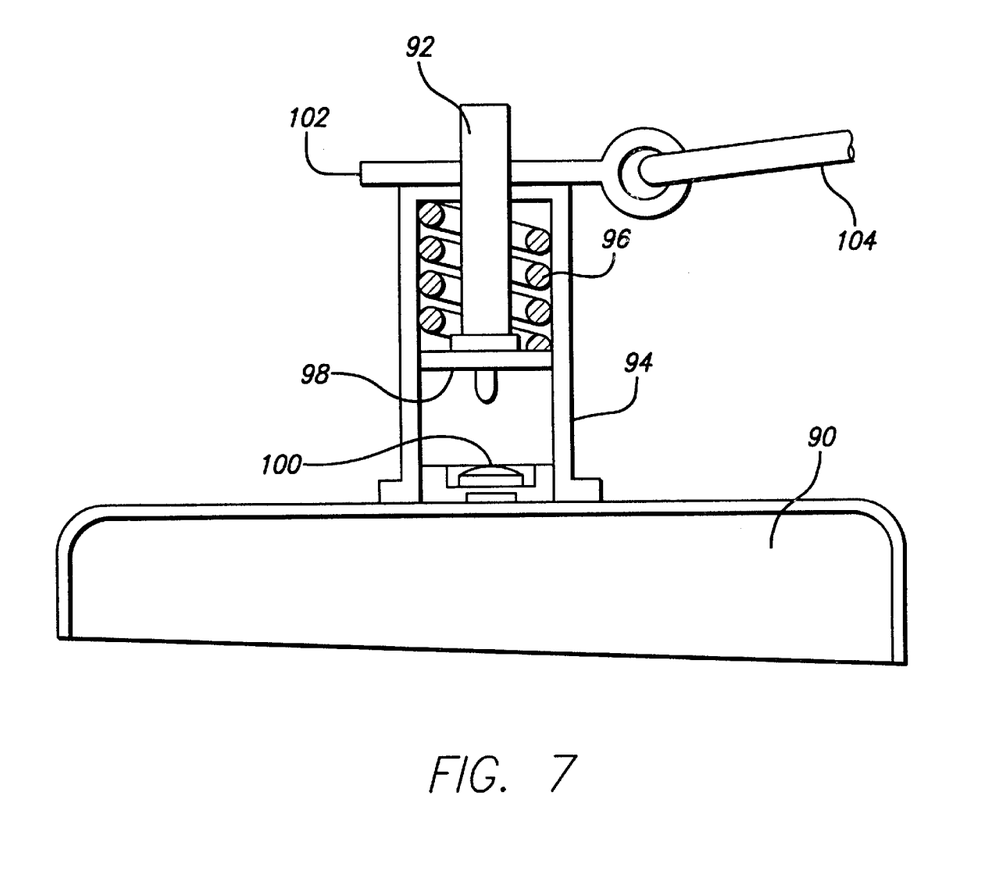
FIG. 7 is an enlarged partial sectional view of a release mechanism for an actuation pin of the ignition assembly of an oxygen generator.

In another aspect of the invention, the movement of the generator from a stowed position to a use position can also initiate the flow of oxygen, as is shown in FIG. 7. The oxygen generator 90 typically has an actuation pin 92 disposed in the actuator pin sleeve 94 of the oxygen generator. A coil spring 96 supported in the actuation pin sleeve presses against the end piece 98 of the actuation pin and biases the actuation pin toward the percussion primer 100. The actuation pin can be secured from striking the percussion primer by a locking pin 102 extending through an aperture in the actuation pin. The locking pin of the oxygen generator, for example, can be attached to one end of a short lanyard 104, while the other end of the lanyard (not shown) can be attached to the module structure, so that when the oxygen generator slides downwardly in relation to the oxygen module structure, the lanyard will withdraw the locking pin from the actuation pin to strike the percussion primer, initiating oxygen flow.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. An emergency oxygen supply system for passengers in aircraft, comprising:
    an oxygen module container, said oxygen module container having a bottom lid;
    an oxygen generator;
    a sliding assembly in the oxygen module container for mounting said oxygen generator, said sliding assembly being pivotally mounted to said oxygen module container for pivoting movement with respect to said oxygen module container for providing said oxygen generator with a first position disposed in said oxygen module container and for moving said oxygen generator by a sliding movement vertically and horizontally away from the container to a second position displaced lower relative to said first position;
    a retractable pin disposed in said oxygen module container, said retractable pin retaining said sliding assembly independently of opening of said bottom lid when said retractable pin is unretracted and releasing said sliding assembly when said retractable pin is retracted; and
    a lower stop disposed in said oxygen module container, said lower stop adapted to receive said sliding assembly and said sliding assembly pivoting to rest on the lower stop to allow said sliding assembly to extend vertically and horizontally away from the container.

2. The emergency oxygen supply system of claim 1, wherein said sliding assembly comprises a telescoping assembly having one end secured to the container and the other end secured to the oxygen generator to provide for sliding movement of said oxygen generator.

3. The emergency oxygen supply system of claim 2, wherein said telescoping assembly comprises multiple sliding segments.

4. The emergency oxygen supply system of claim 1, wherein said sliding assembly comprises an assembly of channel members and rollers.

5. The emergency oxygen supply system of claim 1, further comprising means for initiating the flow of oxygen from said oxygen generator when said oxygen generator moves from said first position to said second position.

6. The emergency oxygen supply system of claim 5, wherein said oxygen generator comprises an actuation pin and an percussion primer, said actuation pin being biased toward striking the percussion primer, and said actuation pin being secured from striking the percussion primer by a locking pin, said locking pin being connected to said oxygen module container, such that when the oxygen generator slides downwardly in relation to the oxygen module container, the locking pin will release the actuation pin to strike the percussion primer, initiating oxygen flow.

7. An emergency oxygen supply system for passengers in aircraft, comprising:
    an oxygen module container, said oxygen module container having a bottom lid;
    an oxygen generator;
    a sliding assembly pivotally mounted to said oxygen module container to allow said sliding assembly to rotatably move within said container and to slide to displace the oxygen generator on a predetermined path vertically and horizontally downward and away from said oxygen module container and below said oxygen module container;
    a retractable means for retaining said sliding assembly disposed in said oxygen module container, said retractable means for retaining said sliding assembly retaining said sliding assembly independently of opening of said bottom lid when said retractable means for retaining said sliding assembly is unretracted and releasing said sliding assembly when said retractable means for retaining said sliding assembly is retracted; and
    a lower stop disposed in said oxygen module container, said lower stop adapted to receive said sliding assembly and said sliding assembly pivoting to rest on the lower stop to allow said sliding assembly to extend vertically and horizontally downward away from said oxygen module container.

8. The oxygen supply system of claim 2, further comprising means for initiating a flow of oxygen from said oxygen generator upon said generator being deployed from said container.

9. The emergency oxygen supply system of claim 8, wherein said oxygen generator comprises an actuation pin and a percussion primer, said actuation pin being biased toward striking the percussion primer, and said actuation pin being secured from striking the percussion primer by a locking pin, said locking pin being connected to said oxygen module container, such that when the oxygen generator slides downwardly in relation to the oxygen module container, the locking pin will release the actuation pin to strike the percussion primer, initiating oxygen flow.

* * * * *

UNITED STATES PATENT AND TRADEMARK OFFICE
CERTIFICATE OF CORRECTION

PATENT NO.     : 6,416,720 B1
DATED          : July 9, 2002
INVENTOR(S)    : James C. Cannon It is certified that error appears in the above-identified patent and that said Letters Patent is hereby corrected as shown below:

Column 6,
Line 45, change "2", to read -- 7 --.

Signed and Sealed this

Fifteenth Day of October, 2002

Attest:

JAMES E. ROGAN
Attesting Officer     Director of the United States Patent and Trademark Office